United States Patent [19]
Bier et al.

[11] Patent Number: 5,253,409
[45] Date of Patent: Oct. 19, 1993

[54] METHOD OF MANUFACTURING A PLASTIC ARTICLE HAVING MICRO-OPENINGS DEFINED THEREIN

[75] Inventors: Wilhelm Bier, Eggenstein-Leopoldshafen; Thomas Schaller, Weingarten; Klaus Schubert, Karlsruhe, all of Fed. Rep. of Germany

[73] Assignee: Kernforschungszentrum Karlsruhe GmbH, Karlsruhe, Fed. Rep. of Germany

[21] Appl. No.: 964,026

[22] Filed: Oct. 21, 1992

[30] Foreign Application Priority Data

Oct. 30, 1991 [DE] Fed. Rep. of Germany ....... 4135676

[51] Int. Cl.$^5$ .............................................. B23P 17/00
[52] U.S. Cl. ......................................... 29/424; 29/423
[58] Field of Search ............... 29/423, 424, 557, 558, 29/DIG. 29, DIG. 44; 264/221, 313; 427/352, 353

[56] References Cited

U.S. PATENT DOCUMENTS

| | | | |
|---|---|---|---|
| 3,074,392 | 1/1963 | Fisher | 125/20 |
| 3,859,713 | 1/1978 | Fiedler | 29/424 X |
| 4,862,575 | 9/1989 | Shirai et al. | 29/424 |
| 4,884,623 | 12/1989 | Suzuki et al. | 29/424 X |
| 5,055,163 | 10/1991 | Bier et al. | 204/11 |

FOREIGN PATENT DOCUMENTS

| | | |
|---|---|---|
| 2812719 | 9/1979 | Fed. Rep. of Germany . |
| 3813711 | 11/1988 | Fed. Rep. of Germany . |
| 3811748 | 10/1989 | Fed. Rep. of Germany . |
| 3842610 | 6/1990 | Fed. Rep. of Germany . |
| 282410 | 9/1990 | Fed. Rep. of Germany . |
| 2115539 | 7/1972 | France . |
| 61-153770 | 1/1988 | Japan . |
| 981502 | 1/1965 | United Kingdom . |

Primary Examiner—Timothy V. Eley
Attorney, Agent, or Firm—Spencer, Frank & Schneider

[57] ABSTRACT

A method of manufacturing a plastic article having micro-openings defined therein by working a semi-finished plastic structure having microrecesses defined on one side thereof, the method including, in the order recited, providing a semi-finished plastic structure having opposing first and second sides, wherein the first side of the opposing sides has microrecesses defined therein; filling the semi-finished plastic structure to cover the microrecesses with a substance which is hardenable and selectively removable; hardening the substance; machining the surface of the hardened substance to smooth it; clamping the semi-finished plastic structure onto a vacuum tensioning device with the smoothed surface of the hardened substance in contact with the vacuum tensioning device; machining the second side of the opposing sides of the semi-finished plastic structure until the microrecesses of the first side are at least partially exposed thereby defining micro-openings in the structure; and removing the hardened substance selectively from the microrecesses.

10 Claims, 3 Drawing Sheets

METHOD OF MANUFACTURING A PLASTIC ARTICLE HAVING MICRO-OPENINGS DEFINED THEREIN

CROSS-REFERENCE TO RELATED APPLICATION

This application claims the priority of application Ser. No. P 41 35 676.4 filed Oct. 30th, 1991 in Germany, the subject matter of which is incorporated herein by reference.

BACKGROUND OF THE INVENTION

1. Field of the Invention

The present invention relates to a method of manufacturing a plastic article having micro-openings defined therein by working a semi-finished plastic structure having microrecesses defined in one side thereof ranging from about two to about several hundred micrometers in size. The end product is a plastic article provided with micro-openings, such as a grid-shaped, mesh-like microstructured article of plastic.

2. Description of the Related Art

The term "microrecesses" as used herein is understood to mean negative structures defined in a semi-finished plastic structure or product that have dimensions which lie in a range between two micrometers and several hundred micrometers.

The method according to the invention is based on semi-finished plastic structures having opposing sides of preferably a plate-like shape in which microrecesses, which determine the shape of the micro-openings defined in the end product, are pre-shaped on one side. Such semi-finished structures may be obtained, for example, if metal tools, produced with the aid of mechanical microprocesses—for example, by working them with a shaping diamond or by X-ray deep-etch lithography—are copied in plastic. A plastic, such as polymethyl methacrylate (PMMA), is usually used for the copying. In the prior art copying methods of injection molding or reaction casting, the process itself requires that a relatively thick base plate is formed underneath the microstructures.

Federal Republic of Germany Patent No. 3,842,610 C1, which corresponds to U.S. Pat. No. 5,055,163 which is incorporated herein by reference, discloses the production of metal foils or plates that have a plurality of fine openings or slits. In this process, a tool is produced that is provided with microstructures on its surface. The microstructures of the tool are copied by means of a molding substance composed of an electrically conductive layer and an electrically insulating layer. The microstructures of the tool are defined through the electrically insulating layer into the electrically conductive layer to produce a mold. The mold is then filled with a metal by electroplating using the electrically conductive layer as the cathode and, finally, the molding substance is removed.

If the tool has microstructures to be copied that are of the type that taper toward the electrically conductive layer, the size of the fine openings in the foils or plates can be set by filling the molding substance to a corresponding depth by electroplating. This process, however, produces only microstructured bodies made of metal.

Federal Republic of Germany Patent No. 3,813,711 A1, which corresponds to U.S. Pat. No. 4,862,575 which is incorporated herein by reference, discloses a method of finishing the surface of an object that is provided with grooves. The method includes the steps of filling grooves in the grooved surface with a softened, brittle material and subsequently milling out the grooved surface.

The brittle material may be a water soluble material, such as, for example, starch, dextrin, a sucrose compound, a carbonate or a chloride. However, a sublimable material, particularly naphthalene, is also suitable as the brittle material. The method is employed on metal surfaces.

The water soluble materials employed as powders to fill the grooves, however, do not permit complete filling of the spaces between the microstructures. Cavities remain because the grain size of conventional powders lies in a range on the order of magnitude of the microstructures. The use of substances which sublimate, on the other hand, requires temperatures above 80° C. at which temperatures sensitive microstructures, for example, those made of PMMA, may deform. The publication, moreover, provides no teaching or suggestion as to how the above-described end products can be obtained.

Japanese Laid-Open Application No. 63-11,244 discloses a method by which burr-free holes can be drilled into work-pieces that are closed on one side. For this purpose, the workpiece that is closed on one side, is filled with polyurethane resin at about 150° C., and is drilled after the resin hardens. The polyurethane resin is then removed by washing with water. Because of the poor solubility of hardened polyurethane resin in water, however, this can obviously not be effected in a gentle manner that would be compatible with the production of microstructures. The working of microstructured, semi-finished plastic products is not discussed.

German Democratic Republic Patent No. 0,282,410 A5 discloses a method of deburring perforated components, particularly sieves, which are straight or rounded into cylinders. The holes of the perforated component are filled with a smoothable, hardenable substance before being machined, which can be easily removed after machining. A polyurethane casting substance or gypsum is employed as the hardenable substance. The removal of this substance is mechanical, for example, by pressurized water, or chemical, for example, by heated hydrochloric acid. The process is therefore unsuitable for microstructured bodies made of plastic.

Federal Republic of Germany Published Application No. 2,812,719 discloses a method for machining porous workpieces in which the pores of the material are filled before machining with a substance that supports the sides of the pore walls and thus seals the pores by lateral pressure. Burr formation is thus made more difficult or is prevented entirely. The type of the filler, its removal, and the manner of working, however, are not disclosed by the reference.

Federal Republic of Germany Published Application No. 3,811,748 C2 discloses a method of producing microgratings, microscreens, etc. in which a plate-shaped body is microstructured on both sides. During working, a foil-like supporting layer is releasably glued to the plate-shaped body. The body is held on a vacuum tensioning device by way of the supporting layer. After the body has been worked, the supporting layer, as well as the adhesive—which is not specified in detail—must be removed.

It is thus an object of the present invention to produce articles having micro-openings, for example, microgratings or micromeshes which, in contrast to the above-mentioned Federal Republic of Germany Patent No. 3,842,610 C1 are not composed of metal but of plastic and which, similar to the process disclosed in that publication, have a size for the openings in the end product which is settable to the desired value in one process step performed, in the case of the present invention, on a semi-finished plastic structure that has defined therein specially pre-shaped microrecesses.

It is another object of the present invention to provide a manufacturing method for plastic articles having micro-openings defined therein which is to be implemented in such a way that a semi-finished plastic structure can be positioned and held during working on a vacuum tensioning device even though the plastic article end product constitutes a microstructured body that is provided with openings, for example, a grating type body.

It is yet another object of the present invention to provide a manufacturing method which may be implemented without deforming or damaging the filigree-like structures of the semi-finished plastic structure.

SUMMARY OF THE INVENTION

These and other objects are accomplished by the present invention which provides a method of manufacturing a plastic article having micro-openings defined therein by working a semi-finished plastic structure having microrecesses defined on one side thereof, the method comprising, in the order recited, providing a semi-finished plastic structure having opposing first and second sides, wherein the first side of the opposing sides has microrecesses defined therein; filling the semi-finished plastic structure to cover the microrecesses with a substance which is hardenable and selectively removable; hardening the substance; machining the surface of the hardened substance to smooth it; clamping the semi-finished plastic structure onto a vacuum tensioning device with the smoothed surface of the hardened substance in contact with the vacuum tensioning device; machining the second side of the opposing sides of the semi-finished plastic structure until the microrecesses of the first side are at least partially exposed thereby defining micro-openings in the structure; and removing the hardened substance selectively from the microrecesses.

Specific features and preferred embodiments of the method according to the invention are disclosed in the following.

DESCRIPTION OF THE PREFERRED EMBODIMENTS

Figure 1A:
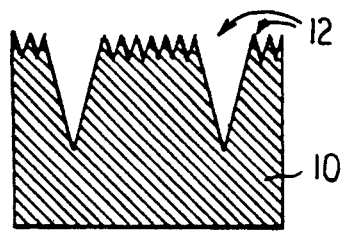
FIG. 1, (a) through (g) is a schematic flow chart for the method according to the invention.

In the method according to the present invention, micro-openings in the plastic article end product are produced from the pre-shaped microrecesses provided in a semi-finished plastic structure. The pre-shaped microrecesses have dimensions ranging from about a few to about several hundred micrometers in size. For example, the microrecesses may have cross-sections having a size ranging from 2 to 400 micrometers. Openings including micro-openings, i.e, micropores, in the end product may have a variety of cross-sectional shapes and dimensions which are determined by the dimensions of the microrecesses. Micro-openings are thus produced which have dimensions corresponding to those of the microrecesses from which they are formed.

The end product may be, for example, a grid-shaped, mesh-like microstructured body of plastic, with the shape and size of the grid bars and the openings varying within wide limits. For example, the grid bars may have different heights and walls that are perpendicular, i.e., straight, or sloped relative to the plane of the grid. The openings may have virtually any cross-sectional shape, for example, a circular, square or slit, i.e., rectangular, shape. However, the end products may have openings which are arranged periodically, such as, for example, in a grid or honeycomb structure, or may have openings which are not arranged periodically but form virtually any grouping, for example, groups that are isolated from one another.

A significant advantage of the method according to the invention is that the semi-finished plastic structure can be positioned on a vacuum tensioning device, such as a vacuum plate, where it can be held for machining. It is thus important that the hardenable substance be selected so that the recesses can be filled completely and without bubbles. Otherwise, the filled semi-finished plastic structure cannot be held reliably since the recesses would be prematurely exposed during working. The openings this creates would cause the applied vacuum to collapse. A firm and reliable fixation of the semi-finished plastic product during working is an absolute prerequisite for the quality and dimensional accuracy of the resulting end product and is obtained by the method of the present invention. Moreover, the method according to the invention prevents the hollow disposed microstructures of the semi-finished plastic structure from bending through. Finally, the hardenable substance prevents the formation of burrs during the machining of the semi-finished plastic product on the side thereof not provided with the microrecesses, which is advantageous since any such burrs could partially close the openings that had been produced by the exposure of the recesses during machining.

The selection of the hardenable substance is further a function of the material characteristics of the semi-finished plastic structure and, particularly, the size and shape of the microrecesses copied therein. The hardenable substance is selected in such a way that it can be selectively removed from the processed semi-finished plastic structure, for example, by dissolving with a solvent. Preferably, therefore, the hardenable substance should be readily soluble in a solvent that does not attack the materials which compose the semi-finished plastic structure even when the hardenable substance is hardened. For plastic structures composed of heat resistant plastics having relatively coarse, non-sensitive microrecesses, known sublimable substances may also be employed as the hardenable substance.

Generally, the material employed for copying microstructured tools is polymethyl methacrylate (PMMA) although many other moldable polymeric materials may be employed. Semi-finished structures made of PMMA and provided with microstructures are very sensitive, however, and must not be exposed to temperatures above about 60° C. The molding of PMMA builds up stresses within the plastic which are the reason for its sensitivity. Due to the danger that the semi-finished structure, and thus the copied microstructures might be distorted, it is frequently not possible to employ even a tempering step at moderate temperatures for reducing the stresses. In such a case, special hardenable substances must be employed and such substances include glues. Glues are hardenable adhesives composed of material from a vegetable or animal source which are soluble in water and which frequently contain water as their solvent. Particularly preferred are glues from an animal source, such as so-called glutine glues. Glues can be easily removed with water even in their hardened state.

The best results are obtained with fish glue which is produced from fish skins and which is a commercially available product. It can be processed at room temperature, hardens with little shrinkage, is inert to most plastics, particularly to PMMA, and adheres excellently to PMMA and other plastics. Finally, hardenable fish glue is easily milled and can be removed, in a manner compatible with the plastic, with cold water and without the use of pressure. Fish glue is therefore particularly preferred as the hardenable substance for the present invention, particularly, when the semi-finished plastic structure is composed of PMMA.

It is often difficult to fill the microrecesses with the hardenable substance without the formation of bubbles, particularly if the microstructures are arranged as a filigree-like grating structure. If complete filling is a problem, the present invention contemplates initially filling the microrecesses with a solvent for the hardenable substance to be employed and then applying the substance to the microrecesses. If fish glue is employed, for example, water is preferred as the solvent.

Even very fine microrecesses surrounded by high microstructures can be filled with solvent and, thus, also with the hardenable substance without the formation of bubbles if the solvent is vapor-deposited onto the microstructured side of the semi-finished plastic structure. That is, the solvent is vaporized and fed to the surfaces of the microrecesses where it condenses in the microrecesses. Thereafter a solution of the hardenable substance in preferably the same solvent is caused to flow onto the semi-finished plastic structure adjacent to the microstructures so as to flood the microrecesses.

Similarly to the above-mentioned method according to Federal Republic of Germany Patent No. 3,842,610 C2, the size of the openings in the plastic article end product of the method according to the invention can be selected. Thus, a tapering shape, for example, a pyramid, a frustopyramid, a cone, a frustocone or a paraboloid, may be selected for the individual microrecesses in the semi-finished plastic structure. The semi-finished plastic product may have a shape, for example, which becomes narrower with increasing depth. The machining of the side of the semi-finished plastic structure not provided with microstructures can be continued until the cross-sections of the microrecesses parallel to the plane of the semi-finished plastic structure have the predetermined size.

The area of the semi-finished plastic structure exposed by the machining does not necessarily constitute a plane, however. If the recesses of the semi-finished plastic structure are tapering recesses and form a grating-like structure, it is possible to produce a distribution of opening sizes in the end product by non-planar machining. If, for example, the area exposed by the machining has a shape that becomes deeper toward the interior (for example, in the form of a spherical cap), the openings in the end product will be larger in the center than in the edge regions.

The invention will now be described in greater detail with reference to the drawing figures.

FIG. 1(a)–(g) is a schematic flow chart which graphically shows the method according to the invention from (a) providing a tool from which to copy a semi-finished plastic structure having microrecesses defined in one side thereof through to (g) an end product which is a plastic article provided with micro-openings. The method is based on providing a microstructured tool 10, for example, made of metal, which has defined therein recesses 12, such as coarse and fine grid-shaped recesses 12. The recesses may be provided, for example, by crisscross working tool 10 with a shaping diamond as is shown schematically in FIG. 1(a). FIG. 2 is a raster electron microscope (REM) photograph of an example of such a microstructured tool 10 according to the invention.

Figure 1B:
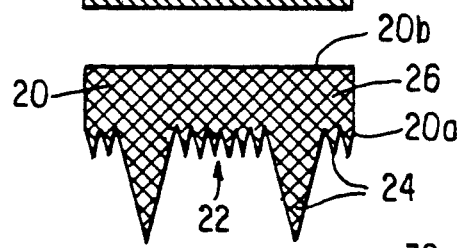
Figure 2:
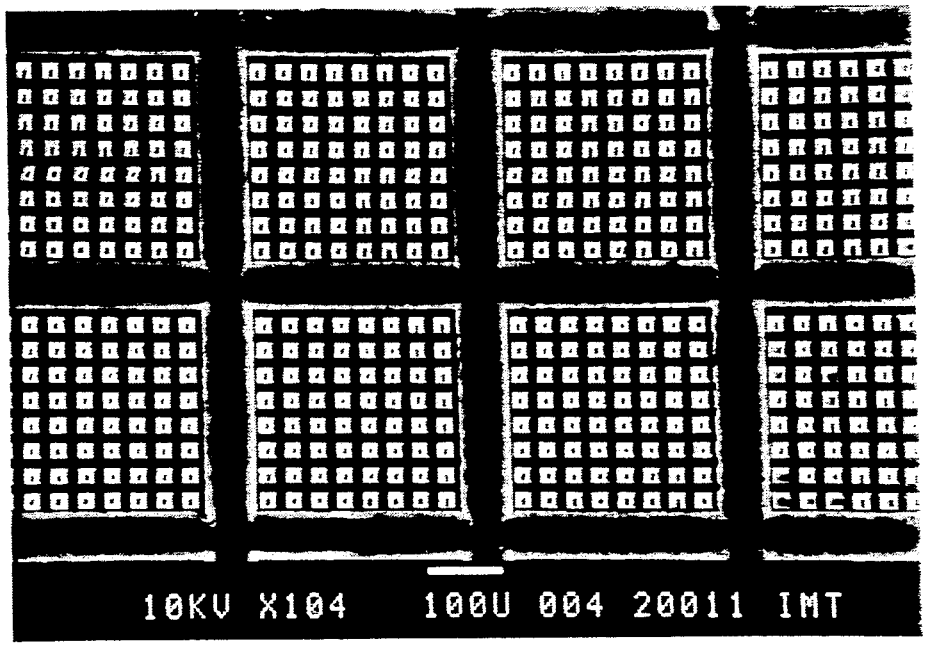
FIG. 2 is a raster electron microscope (REM) photograph of a microstructured tool for use in the present invention.
Figure 3:
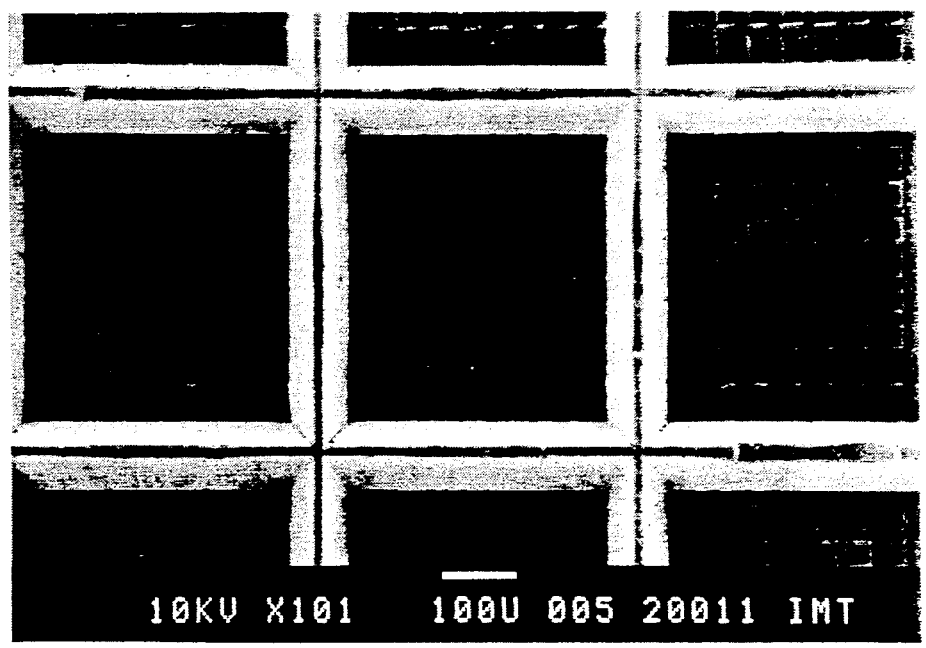
FIG. 3 is an REM photograph of a copied, semi-finished plastic structure provided with microrecesses.

FIG. 1(b) shows a semi-finished plastic structure 20 copied from tool 10 by, for example, molding. Structure 20 has opposing first and second sides 20a, 20b, and a base 26. First side 20a has defined therein microrecesses 22, shown as grid-shaped microstructure composed of coarse and fine webs 24. FIG. 3 is an REM photograph of the copied, semi-finished plastic structure 20 provided with microrecesses 22 of FIG. 1b.

Figure 1C:
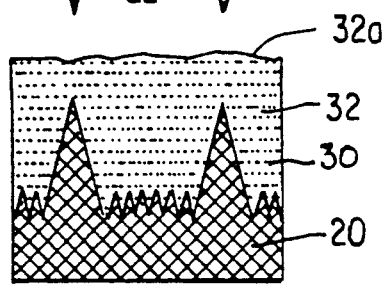
Figure 1D:
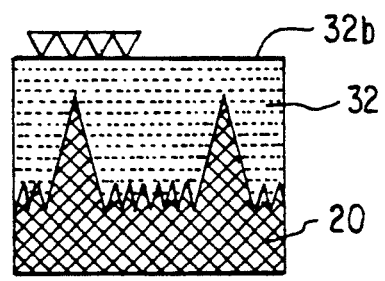

FIG. 1(c) shows the semi-finished plastic structure 20 having recesses 22 filled with and covered by a substance 30 which is hardenable and has been hardened to provide a hardened substance 32 having top surface 32a. As shown in FIG. 1(d), the substance 32 is milled to smooth it into a planar surface 32b.

Figure 1E:
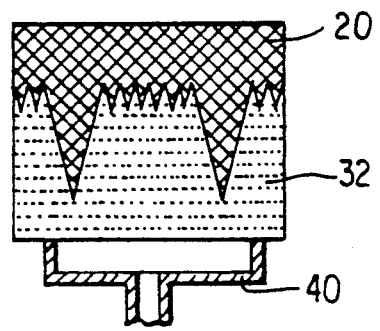
Figure 1F:
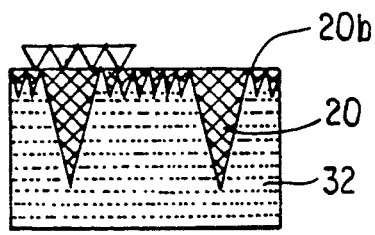
Figure 1G:
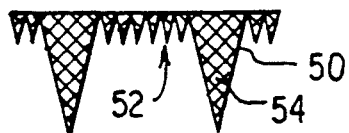
Figure 4:
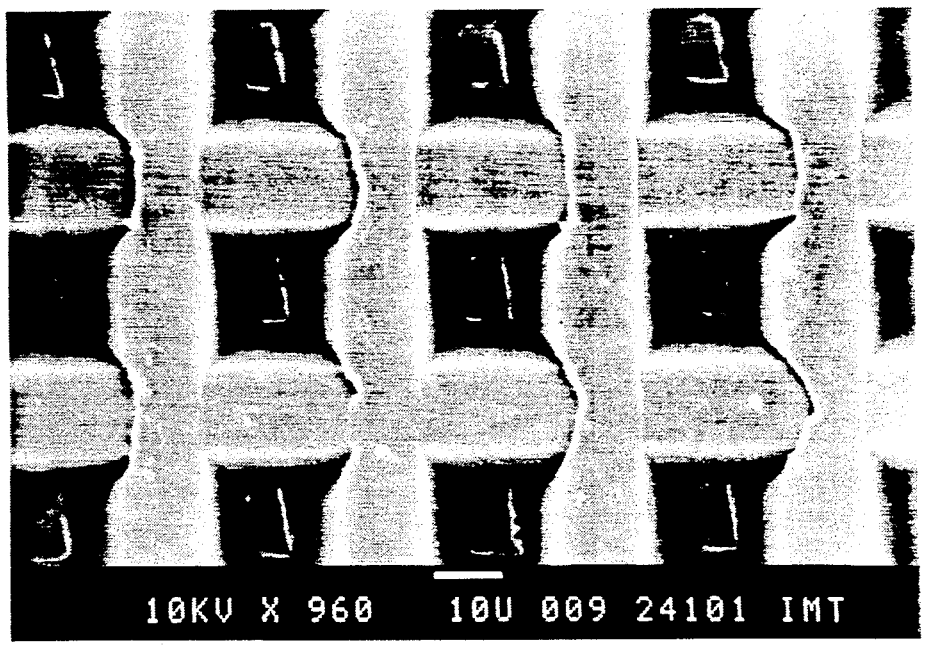
FIGS. 4 and 5 are REM photographs showing a plastic article end product according to the present invention from both sides.
Figure 5:
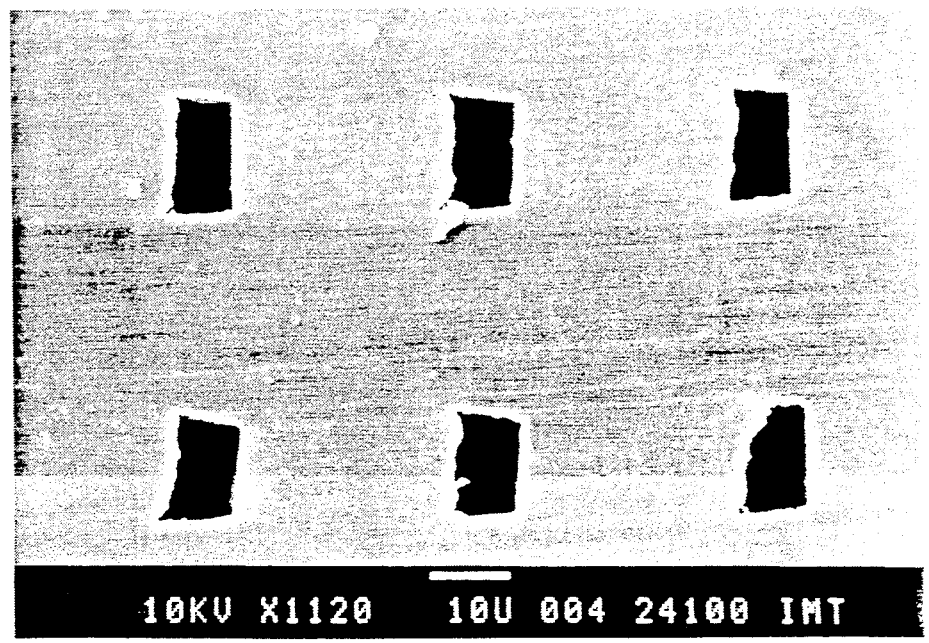

FIG. 1(e) shows the planar surface 32b of the assembly positioned on a vacuum tensioning device 40 and held in place by applying a vacuum thereto. According to FIG. 1(f), the grid webs 24 and recesses 22 of the structure 20 are exposed by milling the second side 20b. After the hardened substance 32 is selectively removed, the microrecesses 22 then correspond to the micro-openings 52 in plastic article 50, the end product shown schematically in FIG. 1(g) as including micro-openings 52 and coarse and fine webs 54. FIGS. 4 and 5 are REM photographs of the plastic article 50 viewed from both sides. FIG. 4 shows the plastic article 50 viewed from the first side 20a and FIG. 5 shows the plastic article 50 viewed from the second side 20b.

EXAMPLE

A tool including microstructures was produced. The microstructures had a profile of raised metal plateaus of 10·10 mm² which were initially defined in the tool.

Crisscross grooves were cut into each plateau by means of a wedge-shaped profiled diamond in such a way that a square network of troughs having a triangular cross-section and a depth of 280 μm was produced in a grid pattern of 400 μm. This provided frustopyramids having cover faces of 300·300 μm².

Then a sub-structure was cut into the frustopyramids by renewed crisscross working. The cover face of each frustopyramid was structured with 8·8 microfrustopyramids at a grid spacing of 40 μm. The height of the microfrustopyramids was 80 μm and the cover faces measured a few 10 μm².

This tool was then copied in PMMA by means of an injection molding machine. The microstructures of the copied semi-finished plastic structure were filled and covered with fish glue which, once it hardened, was milled smooth. For further processing, the PMMA semi-finished structure was positioned with the smooth fish glue side in contact with a vacuum tensioning device. The PMMA on the opposing side of the semi-finished plastic structure was then removed employing an ultramiller until pores of the desired size were opened and exposed. The thickness of the plastic article and its pore diameters can be controlled by varying the amount of material removal. If the application contemplated for the plastic article requires, the base, i.e., bottom, of the plastic article end product may be removed completely so that a plastic mesh is obtained which is composed of webs of, for example, a width of 100 μm and mesh openings of about 300 μm.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method of manufacturing a plastic article having micro-openings defined therein by working a semi-finished plastic structure having microrecesses defined on one side thereof, the method comprising, in the order recited:
   (a) providing a semi-finished plastic structure having opposing first and second sides, wherein the first side of the opposing sides has microrecesses defined therein;
   (b) filling the semi-finished plastic structure to cover the microrecesses with a substance which is hardenable and selectively removable;
   (c) hardening the substance;
   (d) machining the surface of the hardened substance to smooth it;
   (e) positioning the smoothed surface of the hardened substance in contact with a vacuum tensioning device whereby the semi-finished plastic structure is held in place by applying a vacuum thereto;
   (f) machining the second side of the opposing sides of the semi-finished plastic structure until the microrecesses of the first side are at least partially exposed thereby defining micro-openings in the structure; and
   (g) removing the hardened substance selectively from the microrecesses.

2. The method as defined in claim 1, wherein the semi-finished plastic structure is comprised of polymethyl methacrylate (PMMA).

3. The method as defined in claim 1, wherein the substance which is hardenable and selectively removable is a glue.

4. The method as defined in claim 3, wherein the glue is fish glue.

5. The method according to claim 3, wherein the glue is soluble in water and wherein the glue is selectively removed by dissolving the glue out with water.

6. The method as defined in claim 1, wherein step (b), filling the semi-finished plastic structure to cover the microrecesses with a substance which is hardenable and selectively removable, is accomplished by first filling the microrecesses with a solvent which dissolves the substance which is hardenable, followed by applying the substance which is hardenable to the microrecesses.

7. The method as defined in claim 6, wherein filling of the microrecesses is effected by condensation of solvent vapor therein.

8. The method as defined in claim 1, wherein the microrecesses defined in the semi-finished plastic structure have a shape which becomes narrower with increasing depth.

9. The method as defined in claim 8, wherein machining the second side of the opposing sides of the semi-finished plastic structure until the microrecesses of the first side are at least partially exposed is continued until the microrecesses have cross-sections having a predetermined size.

10. The method as defined in claim 9, wherein the microrecesses have cross-sections having a size ranging from 2 to 400 micrometers.

* * * * *